(No Model.)
C. MAYNARD.
WEEDING TOOL.
No. 384,635. Patented June 19, 1888.
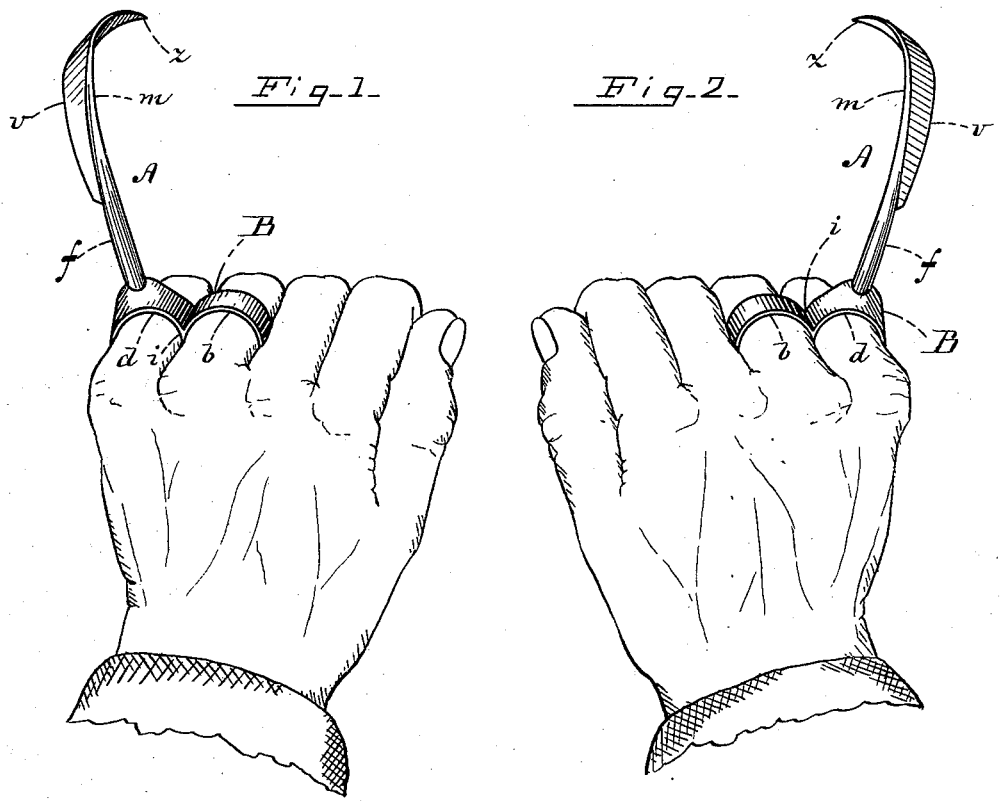
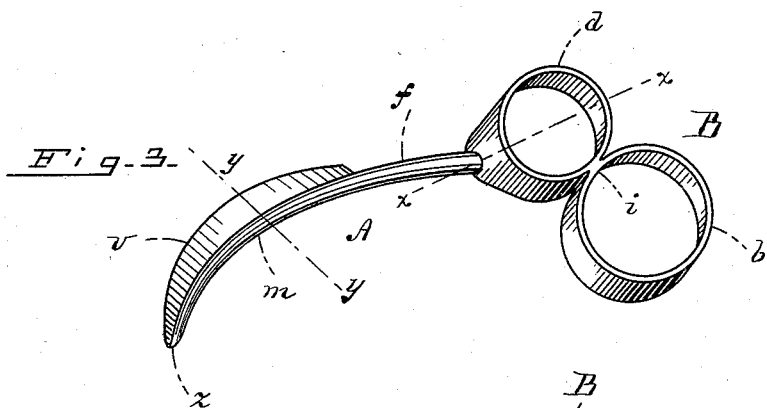
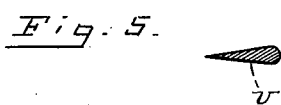
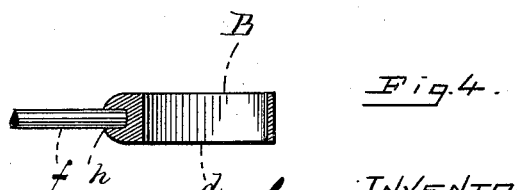

UNITED STATES PATENT OFFICE.

CHARLES MAYNARD, OF MONTAGUE, MASSACHUSETTS.

WEEDING-TOOL.

SPECIFICATION forming part of Letters Patent No. 384,635, dated June 19, 1888.

Application filed March 16, 1888. Serial No. 267,308. (No model.)

*To all whom it may concern:*

Be it known that I, CHARLES MAYNARD, of Montague, in the county of Franklin, State of Massachusetts, have invented a certain new and useful Improvement in Weeding-Tools, of which the following is a description sufficiently full, clear, and exact to enable any person skilled in the art or science to which said invention appertains to make and use the same, reference being had to the accompanying drawings, forming a part of this specification, in which—

Figures 1 and 2 are perspective views showing my improved weeding-tool in position for use on the hand; Fig. 3, a perspective view of the tool removed from the hand; and Figs. 4 and 5, sections taken on lines $x\ x$ and $y\ y$, respectively, in Fig. 3.

Like letters and figures of reference indicate corresponding parts in the different figures of the drawings.

My invention relates to that class of weeding-tools known as "hand-weeders;" and it consists in the novel features hereinafter fully set forth and claimed, the object being to produce a simpler and otherwise more effective device of this character than is now in ordinary use.

The nature and operation of the improvement will be readily understood by all conversant with such matters from the following explanation.

In the drawings, A represents the body of the tool and B the holder, considered as an entirety. The body consists of a metallic rod, $f$, curved, as shown at $m$, and expanded to form the crescent-shaped blade $v$, the outer end being pointed, as shown at $z$. The holder consists of two rings, $b\ d$, joined together at $i$ and adapted to fit the third and fourth fingers, respectively, of the hand. The inner end of the rod $f$ is inserted in a hole, $h$, in the top of the ring $d$, which is slightly thickened at that point, (see Fig. 4,) said rod being secured in said hole by soldering or brazing.

It will be observed that the weeders are "rights" and "lefts," or are constructed with their blades $v$ curving from right to left for use upon the right hand, and from left to right for use upon the left hand.

The operator inserts the third and fourth fingers of the hands, respectively, in the rings $b\ d$ and walks astride the row of plants to be weeded. The weeders are then thrust into the ground and the weeds cut or uprooted by the blades $v$, the stalks of the weeds being then grasped between the thumb and index-finger and readily extracted from the ground, in a manner that will be readily understood by all conversant with such matters without a more explicit description.

I do not confine myself to constructing the body A with its blade $v$ and the holder B separately, as they can be readily cast integral or in one piece, nor to using two of the weeders at the same time.

Having thus explained my invention, what I claim is—

In a weeding-tool, the rings $b\ d$, arranged side by side and rigidly connected, said rings being adapted to fit adjacent fingers of the hand, in combination with the curved rod $f$, provided with the curved blade $v$, having the point $z$, said rod being rigidly secured at its inner end to one of said rings, substantially as set forth.

CHARLES MAYNARD.

Witnesses:
FRANCIS M. THOMPSON,
CHARLES F. THOMPSON.